United States Patent [19]

Yokokura et al.

[11] Patent Number: 4,986,653

[45] Date of Patent: Jan. 22, 1991

[54] LIGHT WAVE RANGE FINDER

[75] Inventors: Takashi Yokokura; Nobuo Hori; Hiroaki Shimozono; Satoru Niimura, all of Tokyo, Japan

[73] Assignee: Kabushiki Kaisha Topcon, Tokyo, Japan

[21] Appl. No.: 228,649

[22] Filed: Aug. 5, 1988

[30] Foreign Application Priority Data

Sep. 16, 1987 [JP] Japan .................................. 62-231796
Sep. 17, 1987 [JP] Japan .................................. 62-233388
Nov. 8, 1987 [JP] Japan .................................. 62-200358
Dec. 8, 1987 [JP] Japan .................................. 62-201134

[51] Int. Cl.$^5$ .............................................. G01C 3/08
[52] U.S. Cl. ..................................... 356/5; 350/96.14; 350/96.18; 350/96.19
[58] Field of Search .............. 356/5; 350/96.14, 96.18, 350/96.19

[56] References Cited

U.S. PATENT DOCUMENTS

| | | | |
|---|---|---|---|
| 3,619,058 | 11/1971 | Hewlett et al. | 356/5 |
| 4,344,705 | 8/1982 | Kompa et al. | 356/5 |
| 4,403,857 | 9/1983 | Holscher | 356/5 |
| 4,498,764 | 2/1985 | Bolkow et al. | 356/5 |
| 4,531,833 | 7/1985 | Ohtomo | 356/5 |
| 4,699,508 | 10/1987 | Bolkow et al. | 356/5 |

Primary Examiner—Stephen C. Buczinski
Attorney, Agent, or Firm—Finnegan, Henderson, Farabow, Garrett & Dunner

[57] ABSTRACT

A light wave range finder has a range finding optical system in which the intensity of a coherent beam of light emitted from a coherent light source is modulated and delivered to an object and a reflecting beam of light reflected on the object is received by an light receiving element. A distance to the object is measured based on a phase detection of the reflecting beam of light. The range finding optical system has an optical substrate which is provided with, at least, a light intensity modulating portion for modulating the intensity of a coherent beam of light; an optical path changing portion for changing the coherent beam of light, which has been modulated the intensity by the light intensity modulating portion, between an external range finding optical path and a reference optical path; a first light amount regulating portion for regulating a light amount of the coherent beam of light guided to the external range finding optical path; a delivering system for delivering the coherent beam of light which has been regulated the light amount of the first light amount regulating portion toward an object; and a light receiving system for receiving a reflecting beam of light reflected by the object.

12 Claims, 9 Drawing Sheets

LIGHT WAVE RANGE FINDER

BACKGROUND OF THE INVENTION

1. Field of the Invention

This invention relates to a light wave range finder in which a range finding optical system includes an integrated circuit. From another aspect, it relates to a light integrated circuit type light intensity modulator which is used in the light wave range finder. From a further different aspect, it relates to an optical path switching device which is used in the light wave range finder.

2. Description of the Prior Art

Figure 14:
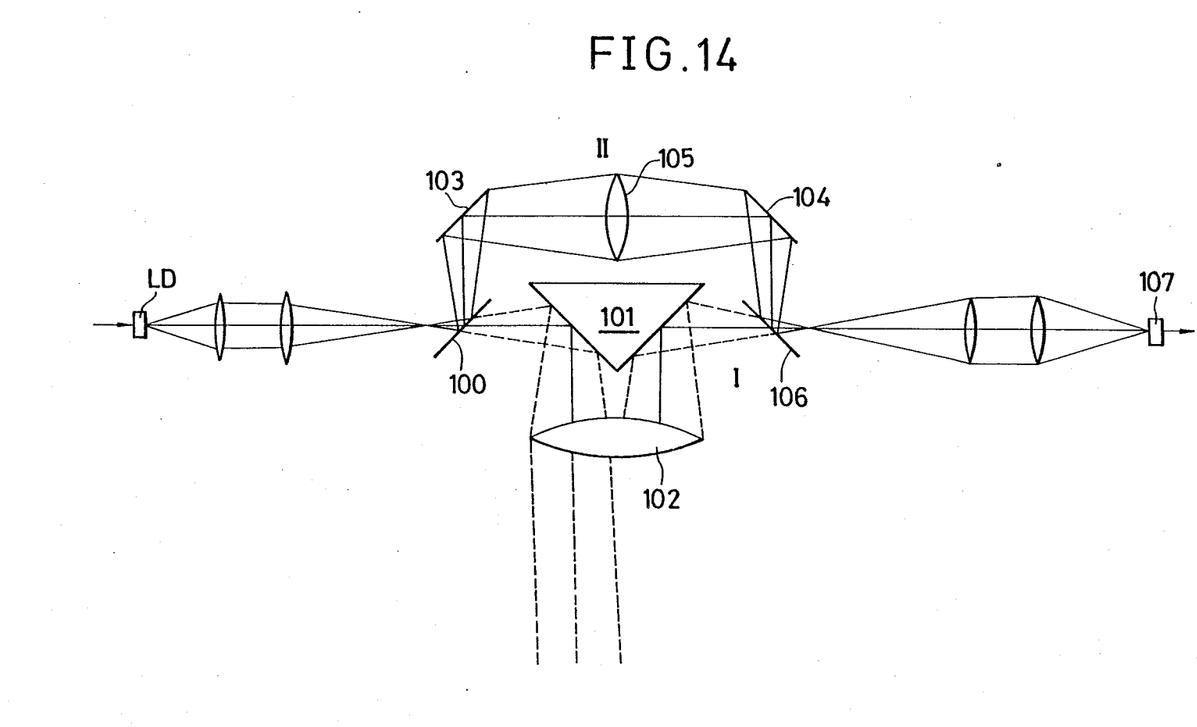
FIG. 14 is an illustration showing one example of a conventional buckle type range finding optical system.

Heretofore, there has been known a light wave range finder including a bulk type range finding optical system as shown in FIG. 14. In FIG. 14, LD denotes a semiconductor laser, 100 denotes a chopper, 101 denotes a reflecting prism which constitutes a part of an external range finding optical path I, 102 denotes an objective lens, 103 and 104 each denotes a total reflection mirror which constitutes a part of an internal reference optical path II, 105 denotes a lens which is disposed between the total reflection mirrors 103 and 104, 106 denotes a half mirror, and 107 denotes a light receiving element.

The semiconductor laser LD emits a coherent beam of light which is modulated in intensity. The chopper 100 has such a function as to switch the intensity modulated coherent beam of light between the external range finding optical path I and the internal reference optical path II. The light wave range finder is provided with a chopping motor (not shown) for driving the chopper 100.

The intensity modulated coherent beam of light is selected by the chopper 100 and guided either to the external range finding optical path I or the internal reference optical path II. The coherent beam of light guided to the external range finding optical path I is reflected by the reflecting prism 101 and guided to a corner cube (not shown) disposed at an observation point through the objective lens 102. Then, the coherent beam of light guided to the external range finding optical path I is reflected by the corner cube to return in the direction where the objective lens 102 is located and guided to the light receiving element 107 through the reflecting prism 101 and the half mirror 106. The coherent beam of light guided to the internal reference optical path II is guided to the light receiving element 107 through the total reflection mirror 103, the lens 105, the total reflection mirror 104 and the half mirror 106.

A distance to the observation point is measured or found in the following manner. First, the delay of the phase of the coherent beam of light arriving at the light receiving element 107 via the external range finding optical path I is digitally counted. Next, the delay of the phase of the coherent beam of light arriving at the light receiving element 107 via the internal reference optical path II is digitally counted. The distance to the observation point is measured or found by such counting as just mentioned. Errors caused by time delay of the internal reference optical path II and the electronic circuit are removed.

However, in the conventional light wave range finder, a chopping motor is necessary in order to switch the internal reference optical path II and the external range finding optical path I. Also, an ND filter of a variable density is required in order to regulate the amount of light. Accordingly, the conventional range finder requires many mechanical operating portions and lacks stability and reliability. Furthermore, the conventional range finder has the shortcomings in that the finder itself becomes large in size, that the finder is difficult to be regulated because of the large number of optical parts and that the cost becomes high.

Moreover, since the conventional range finder is constituted as such that the intensity of light is modulated by modulating the driving electric current of the semiconductor laser, the accuracy of the range finding is likely to decrease due to fluctuation of the oscillating wave length. Since the upper limit of the modulation frequency is about 1 GHz in view of the speed of response, a high speed modulation is difficult to expect.

Next, regarding a light integrated circuit type modulator, there is a known one which uses a branch coherent type optical switch. In this conventional modulator, a coherent light propagating through an incident light guiding wave path is bisected by a Y-branched guiding wave path. The bisected coherent light is guided through a first and a second wave guiding paths and converged at an outgoing light guiding wave path and then taken off as an outgoing light. If the difference of phase of the coherent light guided through the first and the second guiding wave paths becomes $\pi$, an outgoing light from the outgoing light guiding wave path is extinguished due to the interference or coherence. Therefore, in this conventional modulator, at least one of the first and the second guiding wave paths is provided with an electrode as optical path length changing means for changing an optical path, and the electrode is controlled such that the difference of the phase of the coherent light becomes $\pi$.

However, a conventional light integrated circuit type intensity modulator has the shortcoming in that although the modulation frequency can be established, the light amplitude cannot be regulated.

SUMMARY OF THE INVENTION

It is therefore a first object of the present invention to provide a light wave range finder including a small-sized range finding optical system which has no mechanical operating portion.

This first object can be achieved by constituting the range finding optical system such that it uses an optical substrate provided with, at least, a light intensity modulating portion for modulating the intensity of a coherent beam of light; an optical path changing portion for changing the coherent beam of light, which has been modulated in intensity by the light intensity modulating portion, between an external range finding optical path and a reference optical path; a first light amount regulating portion for regulating the amount of the coherent beam of light guided to the external range finding optical path; a delivering system for delivering the coherent beam of light which has been regulated by the first light amount regulating portion toward an object; and a light receiving system for receiving a reflecting beam of light reflected by the object.

A second object of the present invention is to provide a light wave range finder, in which there can be obtained an improved efficiency of optical coupling between an optical substrate, in which an important portion of a range finding optical system is in the form of a light integrated circuit, and an objective optical system.

This second object can be achieved by constituting the light wave range finder such that the range finding optical system includes an optical substrate formed with, at least, an incident light guiding wave path to which a coherent beam of light emitted from a coherent light source is made incident; a light intensity modulating portion for modulating the intensity of the coherent beam of light propagating through the incident light guiding wave path; a delivering system for delivering the coherent beam of light which has been modulated in intensity toward an object; a light receiving system for receiving a reflecting beam of light from the object through the objective optical system; and a received light guiding wave path for propagating the reflecting beam of light received by the light receiving system to a light receiving element, the delivering system comprises a first light coupling device for converging the coherent beam of light which has been modulated in intensity to outside the optical substrate at the focal position of the objective optical system, and the light receiving system comprises a second optical coupling device for making incident to the light receiving guiding wave path the reflecting beam of light which has been converged outside the optical substrate at the focal position of the objective optical system.

According to the above-mentioned constitution, an objective optical system for the use of collimation and an objective optical system for the use of range finding can be commonly used.

A third object of the present invention is to provide a light integrated circuit type light intensity modulator, in which the light intensity can be modulated in a predetermined frequency and the amplitude of light in the predetermined modulation frequency can be regulated.

This third object can be achieved by constituting the light integrated circuit type light intensity modulator as such that the modulator includes a reference light guiding wave path serving as a reference of an optical path length;

a first light guiding wave path disposed in parallel with the reference light guiding wave path and having a first optical path length difference with respect to the reference light guiding wave path;

first optical path difference changing means for changing the first optical path length difference of the first light guiding wave path with respect to the reference light guiding wave path as time lapses;

a second light guiding wave path disposed in parallel with said reference light guiding wave path and having a second optical path length difference with respect to said reference light guiding wave path;

second optical path length difference changing means for establishing a second optical path length difference of the second light guiding wave path to said reference light guiding wave path;

a third light guiding wave path disposed in parallel with the reference light guiding wave path and having a third optical path length difference with respect to said reference light guiding wave path; and third optical path length difference changing means for changing the third optical path length difference of the third light guiding wave path with respect to the reference light guiding wave path as time lapses.

The various light guiding wave paths are formed such that a coherent light emitted from a light source is collected after passing through the reference light guiding wave path and the first through third light guiding wave paths. The first through third optical path length difference changing means being controlled so as to satisfy the condition that the sum of the first optical path length difference and the second optical path length difference is equal to the third optical length difference.

Also, the third object can be achieved by constituting the light integrated circuit type light intensity modulator such that the modulator comprises a first converging guiding wave path for converging coherent light which has passed through a first and a second light guiding wave paths for branching a coherent light emitted from a light source; a second converging guiding wave path for converging coherent light which has passed a third and a fourth light guiding wave paths branched from the first converging guiding wave path; first optical path length changing means for changing an optical length of the first light guiding wave path; and second optical wave length changing means for changing an optical path length of the third light guiding wave path. Either the first or the second optical path length changing means being controlled as such that the modulation frequency of modulation light is changed, and the remaining first or second optical path length changing means is controlled as such that the amplitude of light is changed.

Other objects will become more apparent from the following description taken in conjunction with the accompanying drawings, wherein:

DETAILED DESCRIPTION OF THE EMBODIMENT

Figure 1:
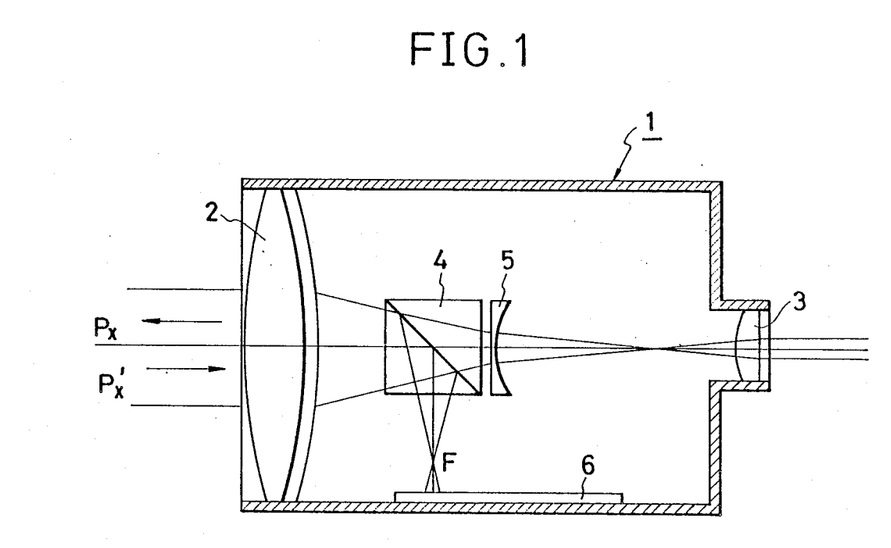
FIG. 1 is a view showing the arrangement of a light wave range finding optical system according to the present invention.

In FIG. 1, 1 denotes a lens barrel which is part of an optical system of a light wave range finder. The lens barrel 1 is provided at its front portion with an objective lens 2 and at its rear portion with an ocular 3. Between the objective lens 2 and the ocular 3, a beam splitter 4 is disposed. A range finding optical system is formed by the objective lens 2 and the beam splitter 4. Between the beam splitter 4 and the ocular 3, a concave lens 5 is disposed. A telescopic optical system is formed by the objective lens 2, the concave lens 5 and the ocular 3.

Figure 2:
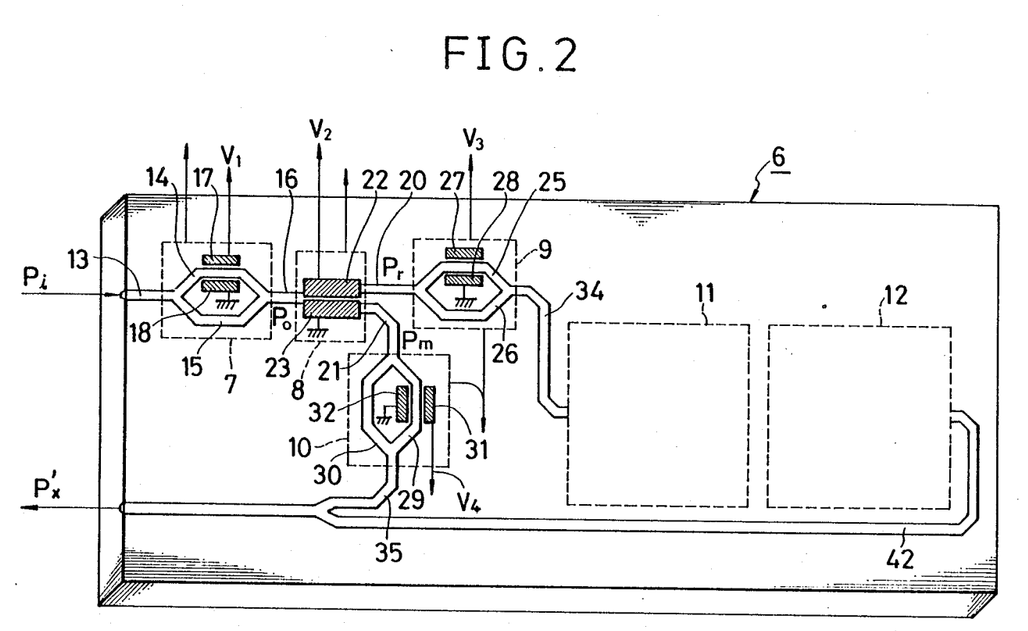
FIG. 2 is a view showing the arrangement of a various optical elements provided on an optical substrate of the range finding optical system.

The lens barrel 1 has an optical substrate 6. As a material forming the optical substrate 6, a crystal of $LiNbO_3$ is used in this embodiment. The optical substrate 6, as shown in FIG. 2, is formed with a light intensity modulating portion 7, an optical path switching portion 8, a first light amount modulating portion 9, a second light amount modulating portion 10, and focusing grating coupler (FGC) as a first and a second coupling devices.

The light intensity modulating portion 7 has an incident light wave path 13. The incident light wave path 13 has incident thereon coherent light $P_i$ emitted from a semiconductor laser LD (see FIG. 6) as a coherent light source. The light intensity modulating portion 7 has branch wave paths 14 and 15 branched from the incident light wave path 13. Branch wave path 14 corresponds to a first light wave path, whereas branch wave path 15 corresponds to a second light wave path. Branch wave paths 14 and 15 are converged into wave path 16. A pair of electrodes 17 and 18 are disposed in the vicinity of branch wave path 14. Electrode 17 is provided with a voltage $V_1$. Electrode 18 is grounded. The pair of electrodes 17 and 18 correspond to first optical path length changing means.

Figure 3:
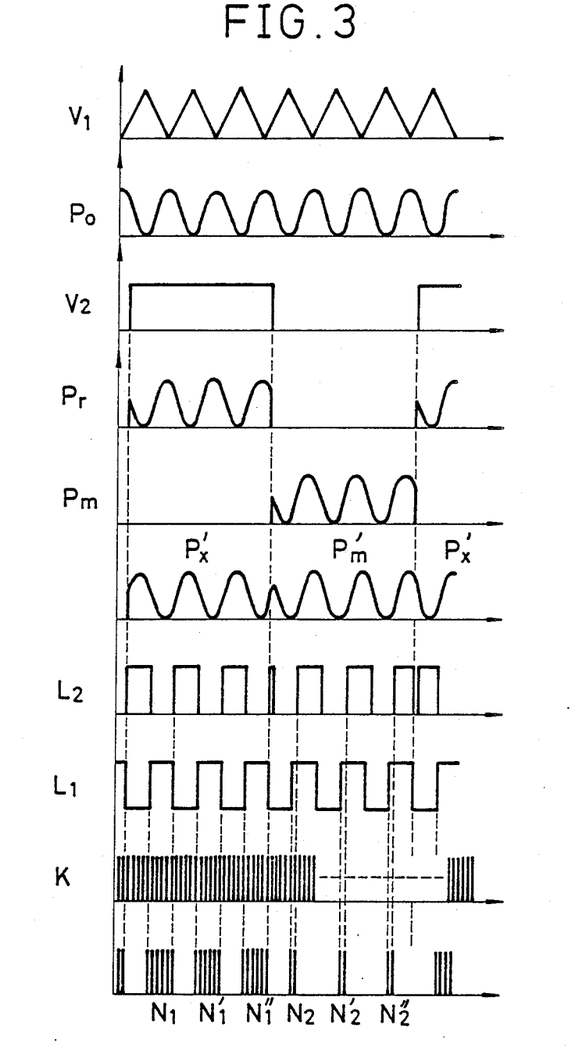
FIG. 3 is a timing illustration for explaining the light wave range finder.
Figures 4, 5:
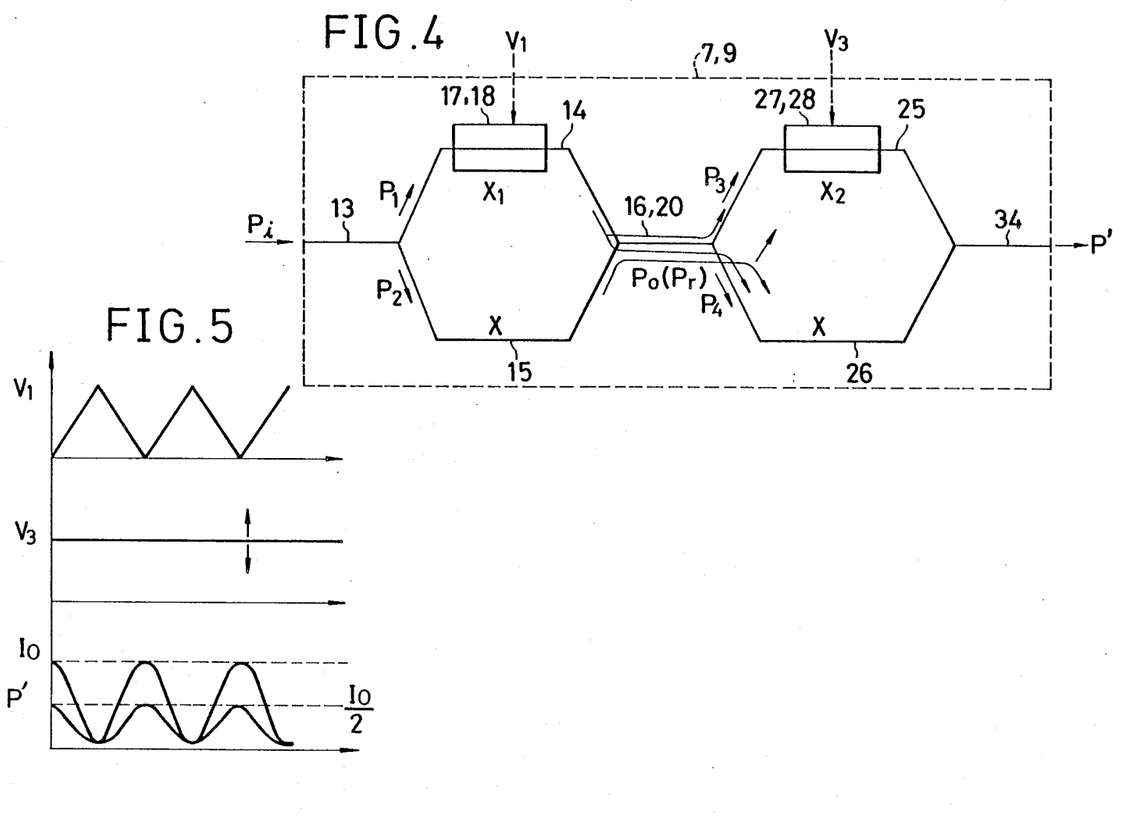
FIG. 4 is a schematic view for explaining the principle of the light intensity modulation and light amount regulation based on a light intensity modulating portion and a first light amount regulating portion shown in FIG. 2.
FIG. 5 is a graph for explaining the principle of the light intensity modulation and light amount regulation.
Figure 6:
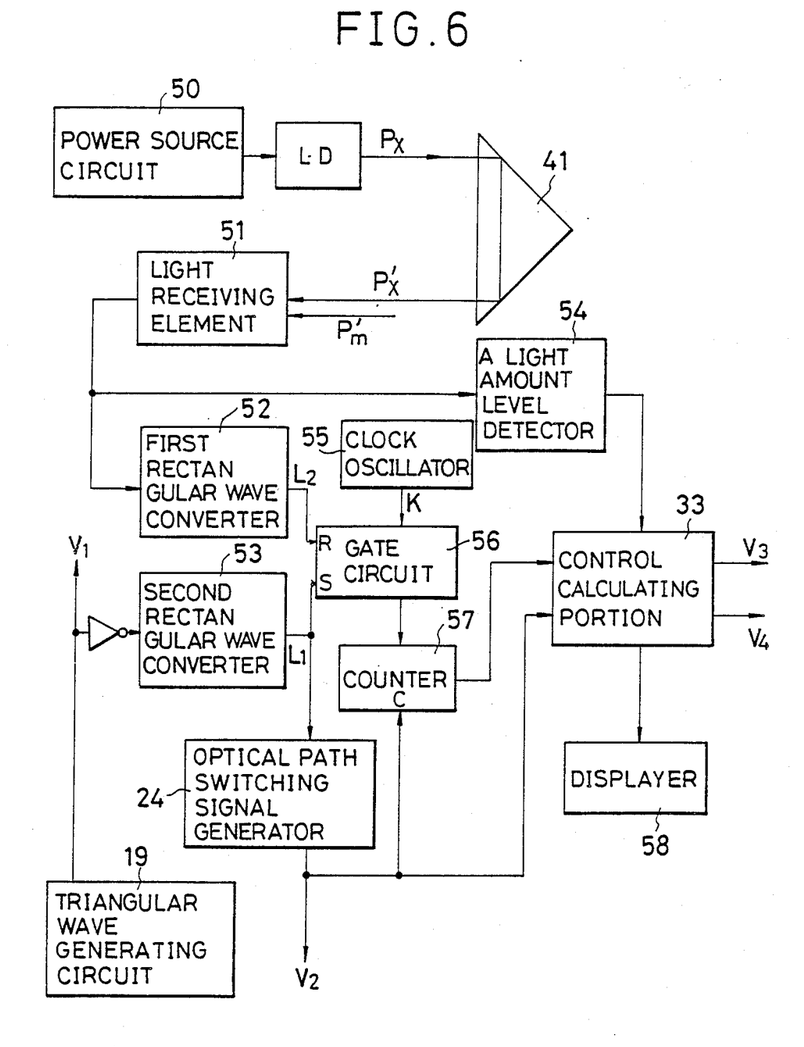
FIG. 6 is a schematic view of a range finding circuit of the light wave range finder.

The voltage $V_1$ is a triangular wave of a predetermined cycle (predetermined frequency) as shown in FIGS. 3 and 5. The voltage $V_1$ is generated by a triangular wave generating circuit 19 as shown in FIG. 6. In this embodiment, the frequency f of the triangular wave is 15 $MH_Z$ or 75 $KH_Z$. The coherent light $P_i$ is modulated in intensity by the light intensity modulating portion 7. A modulated light $P_0$, as shown in FIG. 3, is emitted from the converging guiding wave path 16.

The optical path switching portion 8 comprises a Y-branched wave path in this embodiment. One branch of the Y-branched wave path forms a first wave path 20 leading to a first light amount regulating portion 9. The other branch of the Y-branched wave path forms a second wave path 21 leading to a second light amount regulating portion 10. The optical distance of the first wave path 20 is equal to that of the second wave path 21 in this embodiment. The Y-branched wave path is provided with a pair of electrodes 22 and 23. The electrode 22 is provided with voltage $V_2$, whereas the other electrode 23 is grounded. The voltage $V_2$ is generated by an optical path switching signal generator 24 as shown in FIG. 6. The electric field based on the electrodes 22 and 23 directs in the two directions.

The optical path switching portion 8 switches the modulation light $P_0$ between the first and the second guiding wave paths 20 and 21 by changing voltage $V_2$. In FIGS. 2 and 3, $P_r$ denotes the modulated light $P_0$ guided to the wave path 20, whereas $P_m$ denotes the modulated light $P_0$ guided to the wave path 21. The generation of voltage $V_2$ will be later described. The optical path switching portion 8 is already known (light integrated circuit; issued by Ohmu Sha on Feb. 25, 1985; see pages 310 through 312).

The light amount regulating portion 9 has wave paths 25 and 26. 25 corresponds to a third light guiding path. A pair of electrodes 27 and 28 are disposed in the vicinity of the wave paths 25 and 26. The pair of electrodes 27 and 28 correspond to an optical path length changing means. The light amount regulating portion 10 has wave paths 29 and 30. A pair of electrodes 31 and 32 are disposed in the vicinity of the wave paths 29 and 30. The pair of electrodes 27 and 28 are provided with voltage $V_3$, whereas the other pair of electrodes 31 and 32 are provided with voltage $V_4$. The voltages $V_3$ and $V_4$ are generated by a control calculating portion 33 as shown in FIG. 6. The voltages $V_3$ and $V_4$ have a constant value with respect to time.

The light amount regulating portion 9 has a wave path 34 which is part of an external range finding optical path I. The light amount regulating portion 10 has a wave path 35 which is part of an internal portion reference optical path II. The modulation light $P_0$ is guided to the focusing grating coupler (FGC) via the guiding wave path 34. The focusing grating coupler (FGC) 11 will be described afterward. The principles of the intensity modulation and the light amount regulation will now be described with reference to FIGS. 4 and 5.

FIG. 4 is a schematic view showing the relation between the light intensity modulating portion 7 and the light amount regulating portion 9 (this may be considered as the relation between the light intensity modulating portion 7 and the second light amount regulating portion 10 with the same result). Coherent light $P_i$ guided to wave paths 14 and 15 is represented by $P_1$ and $P_2$, respectively modulated light guided to wave paths 25 and 26 is represented by $P_3$ and $P_4$ respectively. In addition, the optical path length of wave paths 15 and 26 is represented by X, the optical path length of wave path 14 is represented by $X_1$, The optical path length of wave path 25 is represented by $X_2$. The optical path length difference between wave path 14 and wave path 15 is represented by $\delta_1$ and the optical path length difference between wave path 25 and wave path 26 is represented by $\delta_2$. Then, the following formulas can be obtained.

$$X_1 = X + \delta_1$$

$$X_2 = X + \delta_2$$

In this embodiment, the modulated light P' emitted from wave path 34 is composed of light which has passed through four routes a, b, c and d. If wave functions corresponding to the respective routes a, b, c and d are as follows;

a; $e^{ikx}$
b; $e^{ik(x+\delta_1)}$
c; $e^{ik(x+\delta_2)}$
d; $e^{ik(x+\delta_1+\delta_2)}$ the amplitude intensity I of the modulated light P' is given according to the following formula, wherein k is a constant equal to $2\pi/$(unit length).

$$I = |e^{ikx} + e^{ik(x+\delta_1)} + e^{ik(x+\delta_2)} + e^{ik(x+\delta_1+\delta_2)}|^2$$

This formula can be rewritten as follows;

$$\begin{aligned} I &= 1 + e^{ik\delta_1} + e^{ik\delta_2} + e^{ik(\delta_1+\delta_2)} + e^{-ik\delta_1} + 1 + \\ &\quad e^{ik(\delta_2-\delta_1)} + e^{ik\delta_2} + e^{-ik\delta_2} + e^{-ik(\delta_2-\delta_1)} + \\ &\quad 1 + e^{ik\delta_1} + e^{-ik(\delta_1+\delta_2)} + e^{-ik\delta_2} + e^{-ik\delta_1} + 1 \\ &= 4 + 4\cos K\delta_1 + 4\cos K\delta_2 + \\ &\quad 2\cos K(\delta_1 + \delta_2) + 2\cos K(\delta_1 - \delta_2) \\ &= 4 + 4\cos K\delta_1 + 4\cos K\delta_2 + 4\cos K\delta_1 \cos K\delta_2 \\ I &= 4(1 + \cos K\delta_1) + 4\cos K\delta_2(1 + \cos K\delta_1) \\ &= 4(1 + \cos K\delta_1)(1 + \cos K\delta_2) \end{aligned} \quad (1)$$

The $4(1+\cos K\delta_1)$ of factor this formula (1) is a repetitive function of time since optical path length difference $\delta_1$ is periodically changed by the variations in voltage $V_1$, as shown in FIG. 5. On the other hand, with regard to the $(1+\cos K\delta_2)$ factor of formula 1, if the optical path length difference $\delta_2$ is adjusted from a first constant valve to a second constant valve, the maximum amplitude value of the light amplitude intensity $I_0$ is changed. Therefore, the $(1+\cos K\delta_2)$ factor controls the maximum amplitude value of the modulation light.

For example, if the voltage $V_3$ is regulated to establish the optical path length difference $\delta_2$ to $n_1$ wherein $n_1\lambda$ is an integer, the maximum amplitude value of the modulation light P' becomes $I_0$ as shown in FIG. 5. Then, if optical path length difference $\delta_2$ is established to $n_1\lambda+\frac{1}{4}$, the maximum amplitude value of the modulation light P' becomes $I_0/2$. The above analysis may also be applied to the light intensity modulating portion 7 in combination with light amount regulating portion 10.

Figure 7:
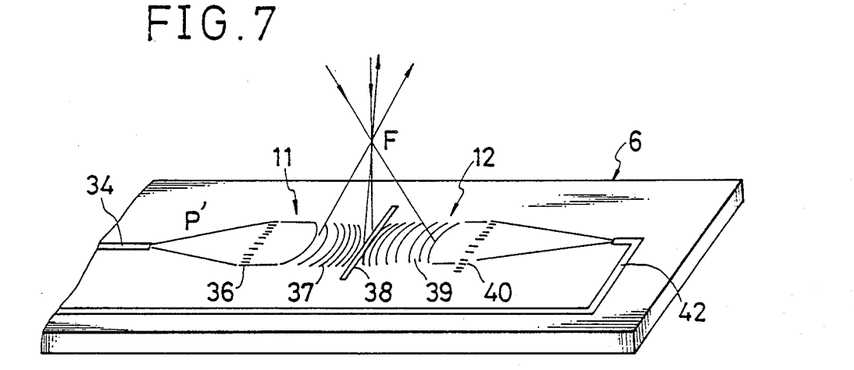
FIGS. 7 through 9 are illustrations for explaining examples of the constitution of the focusing grating coupler (FGC) shown in FIG. 2.

The focusing grating coupler (FGC) 11 functions as a delivering system for delivering the intensity modulated coherent beam of light toward an object. The focusing grating coupler (FGC) 11, as shown in FIG. 7, has a linear grating 36 and a curve chirped grating 37. The modulated light P' guided by wave path 34 is made into a plurality of parallel thin light rays by the linear grating 36 and guided to the curve chirped grating 37. The parallel thin light rays are radiated by the curve chirped grating 37 in such a manner as to be directed to a point outside the optical substrate 6 at the focal point F of the objective lens 2. The light rays focussed to the focal point F are reflected by the beam splitter 4 in the direction where the objective lens 2 is located and then radiated by the objective lens 2 toward the observation point as a plurality of parallel thin light rays $P_x$, as shown in FIG. 1.

The focusing grating coupler (FGC) 12 functions to receive the reflected beam of light reflected by the object through the objective lens 2. The focusing grating coupler (FGC) 12 has a curved chirped grating 39 and a linear grating 40 with a groove 38 as a border. The observation point is provided with a corner cube 41, for example. The parallel light rays $P_x$ are reflected by the corner cube 41 (see FIG. 6) and returned to the objective lens 2 as a reflected beam of light $P_{x'}$, then passed through the objective lens 2 and reflected by the beam splitter 4 in such a manner as to be condensed to the point F. The reflected beam of light $P_{x'}$ is condensed by the curve chirped grating 39 and guided to the linear grating 40 as a plurality of parallel thin light rays. Then, the parallel pencil of rays is condensed to the external range finding guiding wave path 42 as a light receiving guiding wave path by the linear grating 40.

Figure 8:
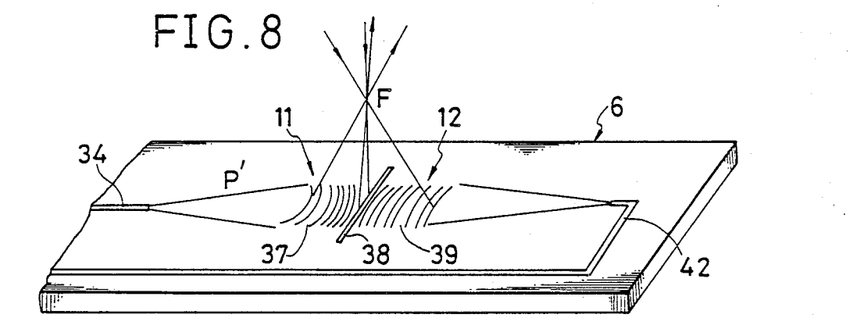

Although the focusing grating coupler (FGC) 11 and 12 are shown such that the linear gratings 36 and 40 and the curve chirped gratings 37 and 39 are disposed in linear symmetry with the groove 38 as a border so that the beam of light becomes a plurality of parallel thin light rays between the linear gratings 36 and 40 and the curve chirped gratings 37 and 39, the linear gratings 36 and 40 may be omitted as shown in FIG. 8.

Figure 9:
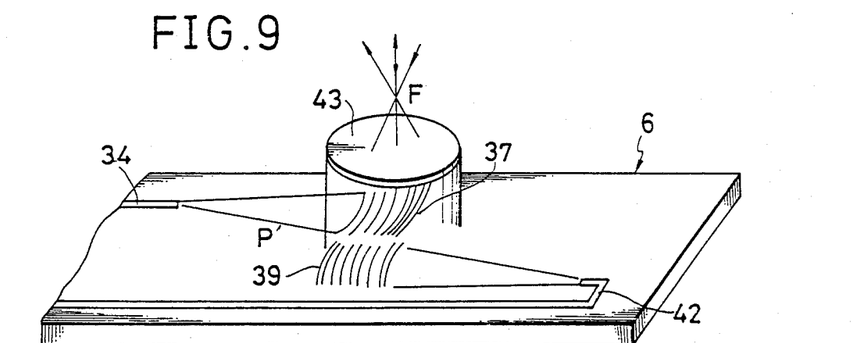
Figure 10:
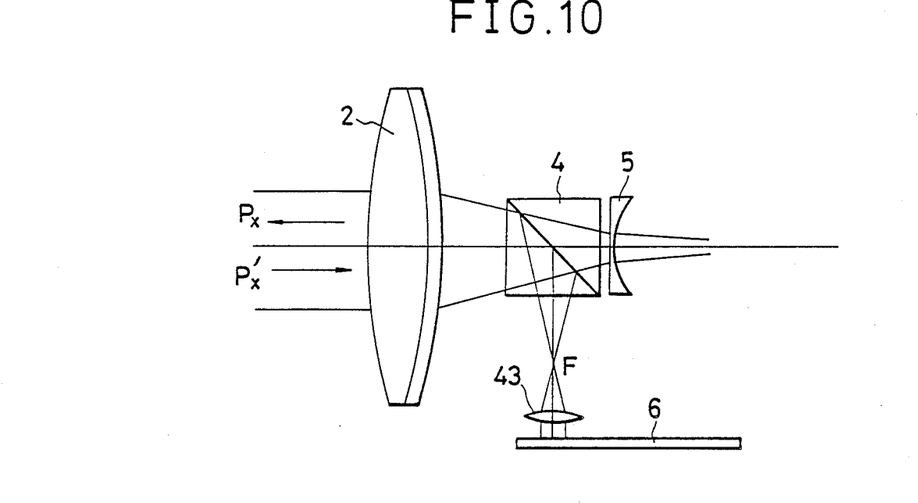
FIG. 10 is an illustration showing the arranging relation between the optical substrate and the objective lens shown in FIG. 9.

As is shown in FIGS. 9 and 10, the curve chirped gratings 37 and 39 may be symmetrically juxtaposed as shown in FIGS. 9 and 10, so that the parallel pencil of rays can be made incident to a free space or emitted therefrom. 43 denotes a lens for focussing the beam of light to the point F.

By providing the focusing grating coupler (FGC) 11 and 12 on the optical substrate 6, the objective lens 2 for collimating the light rays toward an observation point can be commonly used as an objective lens for directing the light toward an object and for receiving reflected light from an object. If a dichroic mirror which reflects infrared light and permits visible light to pass therethrough, is used as the beam splitter 4, and if suitable means for generating an infrared light is used as the semiconductor laser LD, then the reflected beam of light from the corner cube 41 can be guided to the focusing grating coupler (FGC) 12 advantageously.

As shown in FIG. 2, the wave path 42 and the wave path 35 are converged and optically connected to a light receiving element which is part of a range finding circuit as will be hereafter described.

The range finding operation of a light wave range finder according to the present invention will now be described with reference to the range finding circuit shown in FIG. 6.

The range finding circuit has a triangular wave generating circuit 19, an optical path switching signal generator 24 and a control calculating portion 33 as already mentioned. In addition, the range finding circuit has a power source circuit 50 used for a light source, a light receiving element 51, a first rectangular wave converter 52, a second rectangular wave converter 53, a light amount level detector 54, a clock oscillator 55, a gate circuit 56 and a counter 57. Output of the power source circuit 50 for the use of a light source is input in the semiconductor laser LD. The semiconductor laser LD emits the coherent light $P_i$ according to the output of the power source circuit 50.

The voltage $V_1$ of the triangular wave generating circuit 19 is provided to the electrode 17 and input into the second rectangular wave converter 53 through an inverter. The second rectangular wave converter 53 outputs a rectangular wave $L_1$ as shown in FIG. 3. The rectangular wave $L_1$ is input into the optical path switching signal generator 24 and a set terminal S of the gate circuit 56. A reset terminal R of the gate circuit 56 is input with a rectangular wave $L_2$ (see FIG. 3) output from the first rectangular wave converter 52. The rectangular wave $L_2$ of the first rectangular wave converter 52 is generated by coherent light $P_{x'}$ and $P_{m'}$ received by the light receiving element 51.

The gate circuit 56 is input with a clock signal K of the clock oscillator 55. The gate circuit 56 is opened according to the rising of the rectangular wave $L_1$ of the second rectangular wave converter 53 input into the set terminal S. Similarly, the gate circuit 56 is closed according to the rising of the rectangular wave $L_2$ of the first rectangular wave converter 52 input into the reset terminal R. The counter 57 is connected to the gate circuit 56. The counter 57 counts the number of clock pulses which have passed the gate circuit 56. The counter 57 is cleared of the count value when the voltage $V_3$ rises and falls.

The control calculating portion 33 is input with the count value of the counter 57. The control calculating portion 33 functions to carry out a calculation, as will be described, with reference to the count value of the control calculating portion 33 and to establish the values of the voltage $V_3$ and $V_4$ for controlling the light amount regulating portions 9 and 10 according to the output of the light amount regulator 54. That is, the control calculating portion 33 functions to control the light amount regulating portions 9 and 10 so that the intensity of coherent light $P_{m'}$ input into the light receiving element 51 via the internal reference optical path II is generally coincident with that of the coherent light $P_{x'}$ input into the light receiving element 51 via the external range finding optical path I.

The optical path switching signal generator 24 generates the voltage $V_2$ for a predetermined interval according to the falling of the rectangular wave $L_1$. When voltage $V_2$ is high, the number of clock pulses that have passed the gate circuit 56 are represented $N_1$, $N_1'$ and by $N_1''$, as shown in FIG. 3. $N_1$, $N_1$ and $N_1$ which are counted from the rising of the rectangular wave $L_1$ to the falling of the rectangular wave $L_2$ based on the coherent light $P_{x'}$ input into the light receiving element 51 via the external range finding optical path I, are input into the control calculating portion 33. When voltage $V_2$ is low, numbers of clock pulses that have passed the gate circuit 56 is represented by, $N_2'$ and $N_2''$ as shown in FIG. 3, $N_2$, $N_2'$ and $N_2$, which are counted from the rising of the rectangular wave $L_1$ to the falling of the rectangular wave $L_2$ based on the coherent light $P_m'$ input into the light receiving element 51 via the internal reference optical path II, are input into the control calculating portion 33.

There is a time delay based on the distance 1 to the observation point from the time when the coherent light $P_i$ has been emitted via the external range finding optical path I until the time when the coherent light $P_i$ is reflected by the observation point and received by the light receiving element 51. Therefore, if the counting is started with reference to the outgoing time of the coherent light $P_i$ and finished when the coherent light $P_{x'}$ is received, the numbers $N_1$, $N_1'$ and $N_1''$ correspond to the phase difference $\theta_1$ (time delay because of distance 1 to the observation point). On the other hand, a time delay occurs due to the optical distance of the internal reference optical path II until the coherent light $P_i$ which has passed through the internal reference optical path II is received by the light receiving element 51. Therefore, if the counting is started with reference to the outgoing time of the coherent light $P_i$ and finished when the coherent light $P_m'$ is received, the numbers $N_2$, $N_2'$ and $N_3''$ correspond to the phase difference $\theta_2$ (time delay because of the optical distance of the internal reference option path II). This phase difference $\theta_2$ also includes the time delay due to the processing time of the circuit.

Accordingly, the difference $\theta = \theta_1 - \theta_2$ of the phase difference corresponds to the distance to the observation point.

The following relation can be obtained between the difference $\theta$ of the phase difference and the distance $l$ of the wavelength $\lambda (= C/f)$.

$$l = (C/f) \times (\theta/2\pi)$$

In the above formula, C denotes the velocity of light. If $f = 15$ MHz, the wavelength $\lambda = 20$ m, and if $f = 75$ KHz, the wavelength $\lambda' = 4$ Km.

The control calculating portion 33 calculates the distance 1 according to the above-mentioned formula and the calculation results are displayed on a displayer 58.

Figure 11:
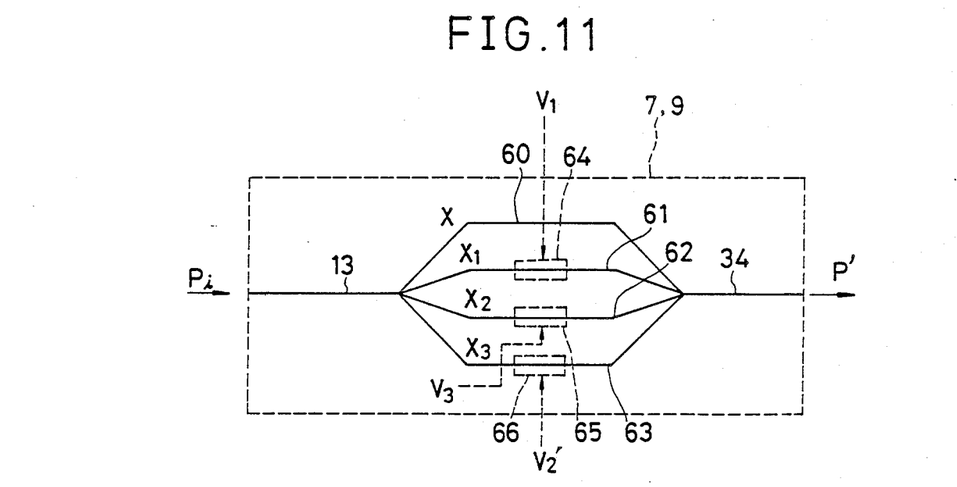
FIG. 11 is a schematic view showing another example of a light integrated circuit type light intensity modulator.

FIG. 11 is a schematic view showing another example of a light intensity modulator. In this embodiment, a reference wave path 60, a first wave path 61, a second wave path 62, and a third wave path 63 are disposed in a parallel configuration. The reference wave path 60, the first wave path 61, the second wave path 62 and the third wave path 63 are branched from an incident light wave path 13 and converged again at wave path 34.

The incident light wave path 13 is made incident with coherent light, $P_i$ coherent light $P_i$ is branched and guided to reference wave path 60, first wave path 61, second wave path 62 and third wave path 63. After passing through reference wave path 60, first wave path 61, second wave path 62 and third wave path 63, coherent light $P_i$ is converged again at wave path 34 and then emitted from wave path 34 as modulated light. In this embodiment, the wavelength of the coherent light $P_i$ is represented by $\lambda$, the intensity of amplitude of the incident light is represented by $I_i$ and the intensity of amplitude of the modulation light is represented by $I_0$.

The reference wave path 60 is used as an optical path length reference, and the optical path length thereof is represented by X. In this embodiment, if the optical path lengths of the first wave path 61, the second wave path 62 and the third wave path 63 are represented by $X_1$, $X_2$ and $X_3$, respectively, and if the first, the second and the third optical path differences of the respective optical path lengths $X_1$, $X_2$ and $X_3$ with respect to the reference wave path 60 are represented by $\delta_1$, $\delta_2$ and $\delta_3$, the following relations can be obtained.

$$X_1 = X + \delta_1$$

$$X_2 = X + \delta_2$$

$$X_3 = X + \delta_3$$

The first wave path 61 is provided with a first optical path length changing means 64 for changing the first optical path length difference $\delta_1$ as time lapses. The second wave path 62 is provided with second optical path length changing means 65 for establishing the second optical path difference $\delta_2$, and the third light guiding wave path 63 is provided with third optical path length difference changing means 66 for changing the third optical length difference $\delta_3$ as the time lapses. The first, the second and the third optical path length difference changing means 64 through 66 comprise first, second and third electrodes disposed in the vicinity of the first, the second and the third wave paths 61 through 63.

Figure 12:
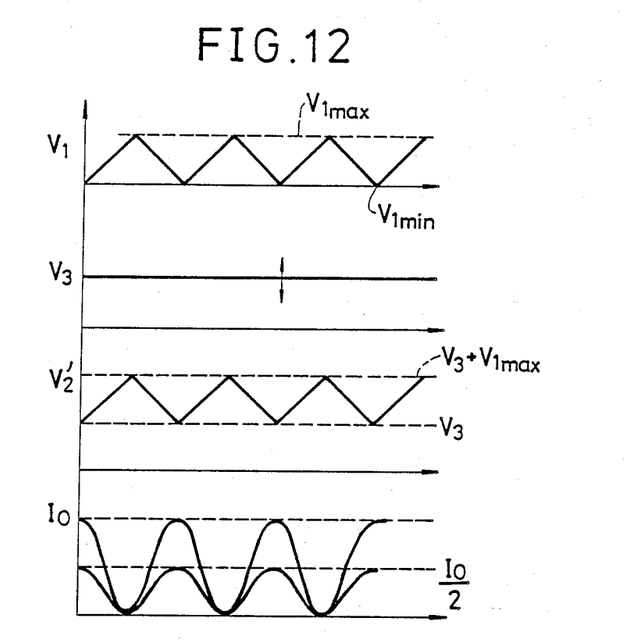
FIG. 12 is an illustration for explaining the function of the light integrated circuit type light intensity modulator shown in FIG. 10.

The first, second and third electrodes are provided with the voltages $V_1$, $V_2$ and $V_2'$ as shown in FIG. 12. The voltage $V_1$ is a triangular wave of a constant cycle and the difference between the minimum voltage $Vi_{min}$ and the maximum voltage $Vi_{max}$ is preferably established as such that the first optical path length difference $\delta_1$ is an integral multiple of one half of the wavelength $\lambda$ of the coherent light P. If the difference is established in that way, the wave shape of the modulation light P' emitted from the guiding wave path 34 becomes, preferably periodic wave.

The voltage $V_3$ is constant with respect to time, and the voltage value thereof can be suitably established. The voltage $V_2'$ is a triangular wave of a constant cycle which is obtained by adding voltage $V_3$ to voltage $V_1$. The voltages $V_2$, $V_1$ and $V_3'$ are established as such that the following relation is satisfied.

$$V_2 = V_1 + V_3$$

If the relation among the voltages $V_2$, $V_1$ and $V_3'$ is established in this way, the respective optical path lengths $X_1$, $X_2$ and $X_3$ can be relatively changed while satisfying the condition that the sum of the first optical path length difference $\delta_1$ and the second optical path length difference $\delta_2$ is equal to the third optical path length difference $\delta_3$.

If the wave functions with respect to the coherent light P passing through the reference wave path 60 and the first through the third wave paths 61 through 63 are expressed, respectively, as follows;

a; $e^{ikx}$
b; $e^{ik(x+\delta_1)}$
c; $e^{ik(x+\delta_2)}$
f; $e^{ik(x+\delta_3)}$ the light intensity amplitude I of the modulation light P' can be expressed based on the following formula, wherein k is a wave number, $2\pi/\lambda$.

$$I = |e^{ikx} + e^{ik(x+\delta_1)} + e^{ik(x+\delta_2)} + e^{ik(x+\delta_3)}|^2$$

This formula can be rewritten as follows;

$$\begin{aligned}I &= 1 + e^{ik\delta_1} + e^{ik\delta_2} + e^{ik(\delta_1+\delta_2)} + e^{-ik\delta_1} + 1 + \\ &\quad e^{ik(\delta_2-\delta_1)} + e^{ik\delta_2} + e^{-ik\delta_3} + e^{-ik(\delta_2-\delta_1)} + \\ &\quad 1 + e^{ik\delta_1} + e^{-ik(\delta_1+\delta_2)} + e^{-ik\delta_2} + e^{-ik\delta_1} + 1 \\ &= 4 + 4\cos K\delta_1 + 4\cos K\delta_2 + \\ &\quad 2\cos K(\delta_1 + \delta_2) + 2\cos K(\delta_1 - \delta_2) \\ &= 4 + 4\cos K\delta_1 + 4\cos K\delta_2 + 4\cos K\delta_1 \cos K\delta_2\end{aligned}$$

The above formula finally becomes as follows;

$$\begin{aligned}I &= 4(1 + \cos K\delta_1) + (4\cos K\delta_2(1 + \cos K\delta_1)) \\ &= 4(1 + \cos K\delta_1)(1 + \cos K\delta_2)\end{aligned} \quad (2)$$

Considering the $4(1+\cos K\delta_1)$ factor of this formula (2), the light amplitude intensity is a repetitive function of time since the first optical path length difference $\delta_1$ is periodically changed due to voltage $V_1$. On considering $(1+\cos K\delta_2)$ factor of the formula (2), if the second optical path length difference $\delta_2$ is changed from a first constant value to a second constant value, the maximum value of the light amplitude intensity $I_0$ is changed accordingly. That is, the $(1+\cos K\delta_2)$ factor gives the maximum amplitude value of the modulation light.

Figure 13:
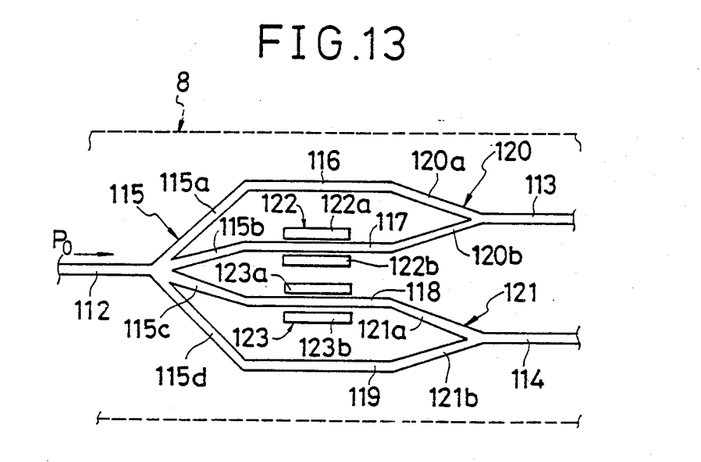
FIG. 13 is an illustration showing another example of the optical path switching portion shown in FIG. 2.

FIG. 13 illustrates another example of the optical path switching portion 8. The optical path switching portion 8 has an inlet wave path 112 in place of the converging wave path 16 as shown in FIG. 2, a first and a second outgoing wave paths 113 and 114 as the wave paths 20 and 21 of FIG. 2, a branch wave path 115 for branching the modulated light $P_0$, parallel wave paths 116 through 119 optically connected to the branch wave path 115 and extending in serial relation therewith, Y-type coupling wave paths 120 and 121 optically connected to the parallel wave paths 116 and 119 and connecting the parallel guiding wave paths 116 through 119 and the first and the second outgoing wave paths 113 and 114.

The branch wave path 115 comprises branch paths 115a through 115d in this embodiment, whereas the Y-type coupling wave paths 120 and 121 comprise coupling paths 120a, 120b, 121a and 121b in this embodiment.

The optical path switching portion 8 has optical path length changing means 122 and 123 in the vicinity of the parallel wave paths 117 and 118. The optical path length changing means 122 and 123 comprise planar electrodes 122a, 122b, 123a, 123b with the parallel wave paths 117 and 118 disposed therebetween. When voltage is applied to the planar electrodes 122a, 122b, 123a, 123b, the refractive index of the parallel wave paths 117 and 118 is changed and the optical paths of the parallel guiding wave paths 117 and 118 are changed accordingly.

When the modulated light $P_0$ is made incident to the inlet guiding wave path 112, the modulated light $P_0$ is propagated through the inlet wave path 112, branched by the branch wave path 115 and propagated through the respective branch paths 115a through 115d. The modulated light $P_0$ propagating through the branch paths 115a and 115b is propagated through the parallel wave paths 116 and 117 and then to the first outgoing guiding wave path 113 through the Y-type coupling wave path 120. Likewise, the modulated light $P_0$ propagating through the branch paths 115c and 115d is propagated through the parallel wave paths 118 and 119 and then guided to the second outgoing wave path 114 through the Y-type coupling path 121.

At that time, voltage is provided to adjacent planar electrodes 122a, 122b, 123a and 123b of the optical path length changing means 122 and 123, and the optical distances of the parallel wave paths 117 and 118 are changed. The optical path difference between the serial wave paths 115a, 116 and 120a and the serial wave paths 115b, 117 and 120b is made to $(\frac{1}{2})\lambda + n\lambda$ (wherein n is an integral number), whereas the optical path difference between the serial wave paths 115c, 118 and 121a and the serial wave paths 115d, 119 and 121b is made to $n\lambda$ (wherein n is an integral number). Then, the phase difference between the modulated light $P_0$ propagating through the coupling path 120a of the Y-type coupling guiding wave path 120 and the modulated light $P_0$ propagating through the coupling path 120b becomes $\pi$. Since these are negated with each other due to coherence, no modulated light $P_0$ is emitted from the first outgoing wave path 113. On the other hand, the phase difference between the modulation light $P_0$ propagating through the coupling path 121a of the Y-type coupling guiding wave circuit 121 and the modulation light $P_0$ propagating through the coupling path 121b becomes $2\pi$. Since these are intensified with respect to one another due to coherence, modulated light $P_0$ is emitted from the second outgoing wave path 114.

Next, the optical distances of parallel wave paths 117 and 118 are changed and the optical path difference between the guiding wave paths 115a, 116 and 120a and the guiding wave paths 115b, 117 and 120b are made to $n\lambda$ (wherein n is an integral number). The optical path difference between the guiding wave paths 115c, 118 and 121a and the guiding wave paths 115d, 118 and 121b are made to $(\frac{1}{2})\lambda + n\lambda$ (wherein n is an integral number). Then, modulated light $P_0$ is emitted from the first outgoing wave path 113, but no modulation light $P_0$ is emitted from the second outgoing wave path 114. By changing voltage provides to the adjacent planar electrodes 122a, 122b, 123a and 123b, the modulated light $P_0$ propagating through the inlet wave path 112 can be switched between the first outgoing wave path 113 and the second outgoing wave path 114. Of course, the optical path switching portion 8 may be used with modulated light $P_0$, as well as light of a constant intensity.

What is claimed is:

1. A coherent light wave range finder having a range finding optical system in which the intensity of a coherent beam of light emitted from a coherent light source is modulated and delivered to an object and a beam of light reflected from the object is received by a light receiving element, a distance to the object being measured based on detection of the phase of the reflected modulated beam of light, comprising:

an optical substrate including a first light intensity modulating portion for modulating the intensity of a coherent beam of light; an optical path changing portion for changing the optical path length of the coherent beam of light between an external range finding optical path and a reference optical path; a first light amount regulating portion for regulating the amplitude of said coherent beam of light guided to the external range finding optical path; and a second light amount regulating portion wherein said first light amount regulating portion and said second light amount regulating portion each includes a wave path that branches into at least two separate wave path branches, at least one of said wave path branches in each of said first and said second light amount regulating portions including an electrode; a directing system for directing said coherent beam of light toward said object; a light receiving system for receiving said beam of light reflected from said object.

2. A light wave range finder according to claim 1, wherein each said electrode of said first and second light amount regulating portions are provided with voltage so that light propagating through said external range finding optical path and received by said light receiving element is substantially the same in density as the light propagating through said reference optical path and received by said light receiving element.

3. A light wave range finder according to claim 1, wherein said optical path switching portion includes a Y-branched wave path, said Y-branched wave path being provided with two electrodes, said two electrodes being provided with voltage so that an electric field is generated to cause light to only propagate through either said external range finding optical path or said reference optical path.

4. A light wave range finder according to claim 1, wherein said coherent beam of light is an infrared light, said objective optical system including an objective lens and a dichroic mirror adapted to reflect the infrared light from the object towards said light receiving system and to guide visible light from the object to an ocular portion.

5. A light wave range finder including a range finding optical system in which the intensity of a coherent beam of light emitted from a coherent light source is modulated and delivered to an object through an objective optical system and the beam of light reflected by the object is received by a light receiving element through said objective optical system, so that a distance to the object can be measured based on detection of the phase of said reflected modulated beam of light, comprising:
an optical substrate including an incident wave path on which the coherent beam of light emitted from the coherent light source is incident; a light intensity modulating portion for modulating the intensity of the coherent beam of light propagating through said wave path; a directing system for directing the modulated coherent beam of light toward the object; a light receiving system for receiving a beam of light reflected from the object through the objective optical system; and a received light wave path for directing said reflected beam of light received by the light receiving system to a light receiving element, said directing system comprising a first optical coupling device for converging the modulated coherent beam of light to a position outside the optical substrate at the focal position of the objective optical system, said light receiving system comprising a second optical coupling device for making said reflected beam of light which has been converged outside the optical substrate at the focal position of the objective optical system incident on said received light wave path.

6. A light wave range finder according to claim 5, wherein said first and second optical coupling devices each comprises a focusing grating coupler.

7. An integrated circuit type light intensity modulator comprising:
a reference light wave path for providing a reference optical path length;
a first light wave path disposed in parallel with said reference light wave path and having a first optical path length difference with respect to said reference light wave path;
first optical path length difference changing means for changing said first optical path length difference of said first light wave path with respect to said reference light wave path as a function of time;
a second light wave path disposed in parallel with the reference light wave path and having a second optical path length difference with respect to the reference light wave path;
second optical path length difference changing means for establishing a second optical path length difference of the second light wave path with respect to the reference light wave path as a function of time;
a third light wave path disposed in parallel with said reference light wave path and having a third optical path length difference with respect to said reference light wave path; and
third optical path length difference changing means for changing a third optical path length difference of said third light wave path with respect to said reference light wave path as a function of time;
the first, second, and third light wave paths being connected so that coherent light passing through said reference light wave path and said first through third light guiding wave paths is incident on an output wave path, said first through third optical path length difference changing means including an electrode and being controlled so as to satisfy the condition that the sum of said first optical path length difference and said second optical path length difference is equal to said third optical path difference.

8. An light integrated circuit type light intensity modulator according to claim 7, wherein said first through third optical path length difference changing means comprise first through third electrodes disposed in the vicinity of said first through third light guiding wave paths and are capable of being provided with a voltage.

9. An integrated circuit type light intensity modulator according to claim 8, wherein said first electrode is provided with a voltage so that the optical path length of said first light guiding wave path is changed so that the resulting optical path length is an integral multiple of one half of the wavelength of said coherent light.

10. An integrated circuit type light intensity modulator comprising: a first converging wave path for converging coherent light which has passed through a first wave path and a second wave path, said first and second wave paths propagating coherent light emitted from a light source; a second converging wave path for converging coherent light which has passed through a third wave path and a fourth wave path, said third and fourth wave paths propagating coherent light from said first converging wave path; first optical path length changing means for changing an optical path length of said first wave path; and second optical path length changing means for changing an optical path length of said third wave path; one of said first or said second optical path length changing means being controlled so that the modulation frequency of said coherent light is regulated, and the other of said first or second optical path length changing means being controlled so that the amplitude of said coherent light is regulated.

11. An integrated circuit type light intensity modulator according to claim 10, wherein said first optical path changing means comprises a first electrode disposed in the vicinity of said first wave path and is provided with a voltage, and wherein said second optical path length changing means comprises a second electrode disposed in the vicinity of said third wave path and is provided with a voltage.

12. An optical switching device comprising: an incident wave path; and a plurality of output wave paths, said incident wave path and each of said plurality of output wave paths coupled by two parallel wave paths disposed in parallel relation, at least one of each of said two parallel wave paths being provided with optical path length changing means for changing the optical path length, said optical path length changing means being regulated to allow light propagating through said plurality of output wave paths to be selectively emitted from said plurality of output wave paths.

* * * * *

UNITED STATES PATENT AND TRADEMARK OFFICE
CERTIFICATE OF CORRECTION

PATENT NO. : 4,986,653

DATED : January 22, 1991

INVENTOR(S) : Yokokura et al.

It is certified that error appears in the above-identified patent and that said Letters Patent is hereby corrected as shown below:

Claim 8, col. 14, line 50, delete "light" (first occurrence); and

Signed and Sealed this

Fourteenth Day of July, 1992

Attest:

DOUGLAS B. COMER

*Attesting Officer*          *Acting Commissioner of Patents and Trademarks*

UNITED STATES PATENT AND TRADEMARK OFFICE
CERTIFICATE OF CORRECTION

PATENT NO. : 4,986,653

DATED : January 22, 1991

INVENTOR(S) : Takashi YOKOKURA et al.

It is certified that error appears in the above-identified patent and that said Letters Patent is hereby corrected as shown below:

Claim 8: Col. 14, line 54, delete "guiding".

Signed and Sealed this

Tenth Day of August, 1993

Attest:

MICHAEL K. KIRK

Attesting Officer      Acting Commissioner of Patents and Trademarks